US010517111B2

(12) United States Patent
Li et al.

(10) Patent No.: US 10,517,111 B2
(45) Date of Patent: Dec. 24, 2019

(54) MITIGATING SCHEDULING CONFLICTS IN WIRELESS COMMUNICATION DEVICES

(71) Applicant: APPLE INC., Cupertino, CA (US)

(72) Inventors: Lei Li, Sunnyvale, CA (US); Xiaojun Chen, San Jose, CA (US); Vusthla Sunil Reddy, Cupertino, CA (US); Mohit Narang, Cupertino, CA (US); Qiyang Wu, Fremont, CA (US); Peter M. Agboh, Burlingame, CA (US)

(73) Assignee: Apple Inc., Cupertino, CA (US)

(*) Notice: Subject to any disclaimer, the term of this patent is extended or adjusted under 35 U.S.C. 154(b) by 149 days.

(21) Appl. No.: 15/708,746

(22) Filed: Sep. 19, 2017

(65) Prior Publication Data
US 2018/0084569 A1 Mar. 22, 2018

Related U.S. Application Data

(60) Provisional application No. 62/397,693, filed on Sep. 21, 2016.

(51) Int. Cl.
H04W 4/00 (2018.01)
H04W 72/12 (2009.01)
H04W 72/04 (2009.01)
H04W 84/20 (2009.01)
H04W 4/80 (2018.01)
H04W 4/70 (2018.01)

(52) U.S. Cl.
CPC ... *H04W 72/1263* (2013.01); *H04W 72/0446* (2013.01); *H04W 72/1252* (2013.01); *H04W 4/70* (2018.02); *H04W 4/80* (2018.02); *H04W 84/20* (2013.01)

(58) Field of Classification Search
CPC . H04W 72/12; H04W 72/04; H04W 72/1263; H04W 72/1252; H04W 72/0446; H04W 84/20; H04W 4/80; H04W 4/70; H04B 1/707; H04B 7/024; H04B 7/0417; H04L 1/0026; H04L 1/0073; H04L 1/08; H04L 1/1671; H04L 1/1858
USPC ...... 370/329, 342, 311; 375/267; 455/426.1, 455/41.1
See application file for complete search history.

(56) References Cited

U.S. PATENT DOCUMENTS 6,775,258 B1 * 8/2004 van Valkenburg ...... H04L 45/00
370/338
6,975,613 B1 * 12/2005 Johansson ............. H04W 72/12
370/331

(Continued)

FOREIGN PATENT DOCUMENTS

WO WO-0128157 A2 * 4/2001 ............ H04W 48/14

Primary Examiner — Mahendra R Patel
(74) Attorney, Agent, or Firm — Fay Kaplun & Marcin, LLP

(57) ABSTRACT

Exemplary embodiments include a method performed by a wireless device configured as a slave in a first piconet and configured as a master in a second piconet. The method includes determining whether the wireless device has data to transmit over the second piconet to an other wireless device, determining an availability of a full slot in a first piconet schedule, selecting a data transmission scheme based on the availability of the full slot in the first piconet schedule and transmitting the data via the second piconet to the other wireless device in accordance with the selected data transmission scheme.

20 Claims, 9 Drawing Sheets

(56) References Cited

U.S. PATENT DOCUMENTS

| | | | | |
|---|---|---|---|---|
| 7,047,051 | B2* | 5/2006 | Sackett | H04W 52/0229 455/574 |
| 8,768,252 | B2* | 7/2014 | Watson | H04R 5/02 455/41.2 |
| 2002/0065045 | A1* | 5/2002 | Kim | H04L 12/66 455/41.2 |
| 2003/0076842 | A1* | 4/2003 | Johansson | H04L 41/00 370/401 |
| 2003/0088682 | A1* | 5/2003 | Hlasny | H04L 29/06 709/229 |
| 2005/0221752 | A1* | 10/2005 | Jamieson | H04L 45/04 455/1 |
| 2007/0268875 | A1* | 11/2007 | Lee | H04W 84/20 370/338 |
| 2010/0002676 | A1* | 1/2010 | Doi | H04W 74/04 370/345 |
| 2010/0226455 | A1* | 9/2010 | Porat | H04B 7/024 375/267 |
| 2012/0176947 | A1* | 7/2012 | Xi | H04L 1/0026 370/311 |
| 2013/0107828 | A1* | 5/2013 | Dinan | H04W 72/0446 370/329 |
| 2013/0142288 | A1* | 6/2013 | Dinan | H04L 27/2649 375/340 |
| 2014/0169795 | A1* | 6/2014 | Clough | G06F 19/3418 398/106 |
| 2015/0022011 | A1* | 1/2015 | Kim | H04B 5/0037 307/104 |
| 2016/0119820 | A1* | 4/2016 | Lin | H04W 72/02 370/342 |

\* cited by examiner

Example on B2B link packet type and payload

Table 200

| Packet Type | Percentage used in typical B2B link | B2B Payload (bytes) | |
|---|---|---|---|
| | | Average | Max |
| NULL | 49% | 0 | 0 |
| POLL | 44% | 0 | 0 |
| ID | 3% | 0 | 0 |
| 2-DH1 | 4% | 33 | 38 |

A scheduling conflict example. BT packet vs time slot

Graph 300

310

Bud-to-Bud — 104
Source-to-Bud — 102

Fig. 7
Graph 700
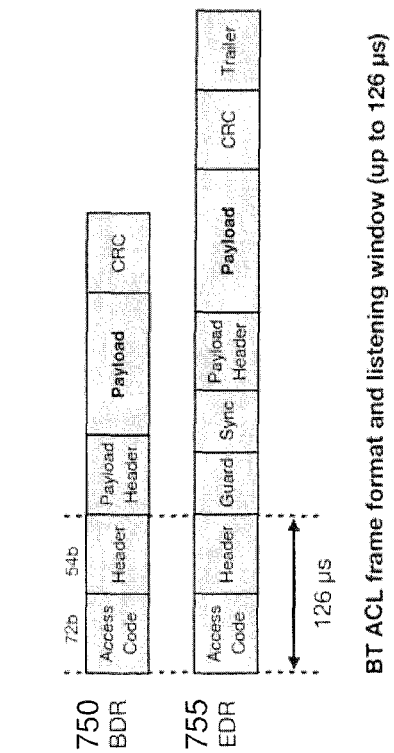
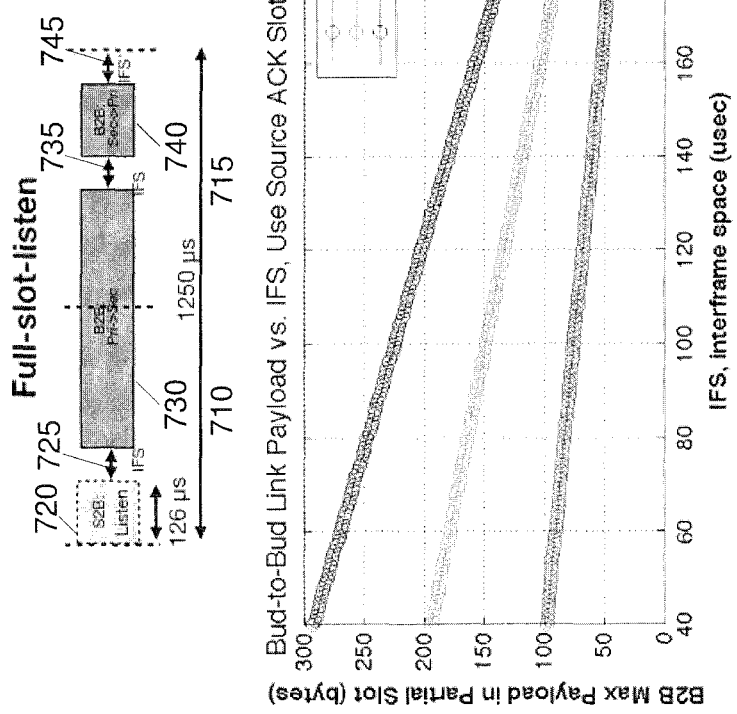

MITIGATING SCHEDULING CONFLICTS IN WIRELESS COMMUNICATION DEVICES

PRIORITY/INCORPORATION BY REFERENCE

This application claims priority to U.S. Provisional Application 62/397,693 entitled "Apparatus, Systems and Methods for Mitigating Scheduling Conflicts in Wireless Communication Devices," filed on Sep. 21, 2016, the entirety of which is incorporated herein by reference.

BACKGROUND

Wireless communication systems are rapidly growing in both usage and the number of connected devices. A personal area network ("PAN") may be defined as a computer network used for data transmission amongst devices such as computers, telephones, tablets, personal digital assistants, wearables, Internet of Things (IoT) devices, etc. For instance, a PAN may be used for communication between the devices themselves (e.g., interpersonal communication), or for connecting one or more devices to a higher level network and the Internet via an uplink, wherein one "master" device takes up the role as internet router. Furthermore, a wireless PAN is a network for interconnecting devices wherein the connections are wireless, using wireless technologies, such as Bluetooth.

A piconet consists of two or more devices occupying the same physical channel (e.g., synchronized to a common clock and hopping sequence). Typically, a piconet allows for one master (or primary) device to interconnect with up to seven active slave (or secondary) devices. For instance, examples of piconets include a cell phone connected to a computer, a laptop and a Bluetooth-enabled digital camera, or several tablet computers that are connected to each other.

When two or more independent, non-synchronized Bluetooth piconets overlap, a scatternet is formed in a seamless, ad-hoc fashion allowing for inter-piconet communication. In other words, a scatternet is a type of computer network consisting of two or more piconets, wherein a Bluetooth node may be a master in one piconet and a slave in one or more other piconets. However, piconet scheduling may not be coordinated so the shared master/slave node in the Bluetooth scatternet may have scheduling conflicts that result in packet drops. Accordingly, a need exists for mitigating scheduling conflicts in wireless communication devices within a scatternet.

SUMMARY

Some exemplary embodiments are directed to a method performed by at a wireless device configured as a slave in a first piconet and configured as a master in a second piconet. The method includes determining whether the wireless device has data to transmit over the second piconet to an other wireless device, determining an availability of a full slot in a first piconet schedule, selecting a data transmission scheme based on the availability of the full slot in the first piconet schedule and transmitting the data via the second piconet to the other wireless device in accordance with the selected data transmission scheme.

Some other exemplary embodiments are directed to a wireless device capable of communicating via a first piconet and a second piconet. The wireless device includes a baseband processor configured to determine whether the wireless device has data to transmit over the second piconet to an other wireless device, determine an availability of a full slot in a first piconet schedule and select a data transmission scheme based on the availability of the full slot in the first piconet schedule and a transceiver configured to transmit the data via the second piconet to the other wireless device in accordance with the selected data transmission scheme.

Still other exemplary embodiments are directed to a wireless device including a non-transitory memory having a program stored thereon and a processor. Execution of the program causes the processor to perform operations including determining whether the wireless device has data to transmit over the second piconet to an other wireless device, determining an availability of a full slot in a schedule of the first piconet, selecting a data transmission scheme based on the availability of the full slot in the schedule of the first piconet and transmitting the data via the second piconet to the other wireless device in accordance with the selected data transmission scheme.

BRIEF DESCRIPTION OF THE DRAWINGS

FIG. 7 shows the transmission graph for an example of a Full-slot-listen Scheme, as well as the impact on the IFS, according to the exemplary embodiments described herein.

DETAILED DESCRIPTION

Figure 1:
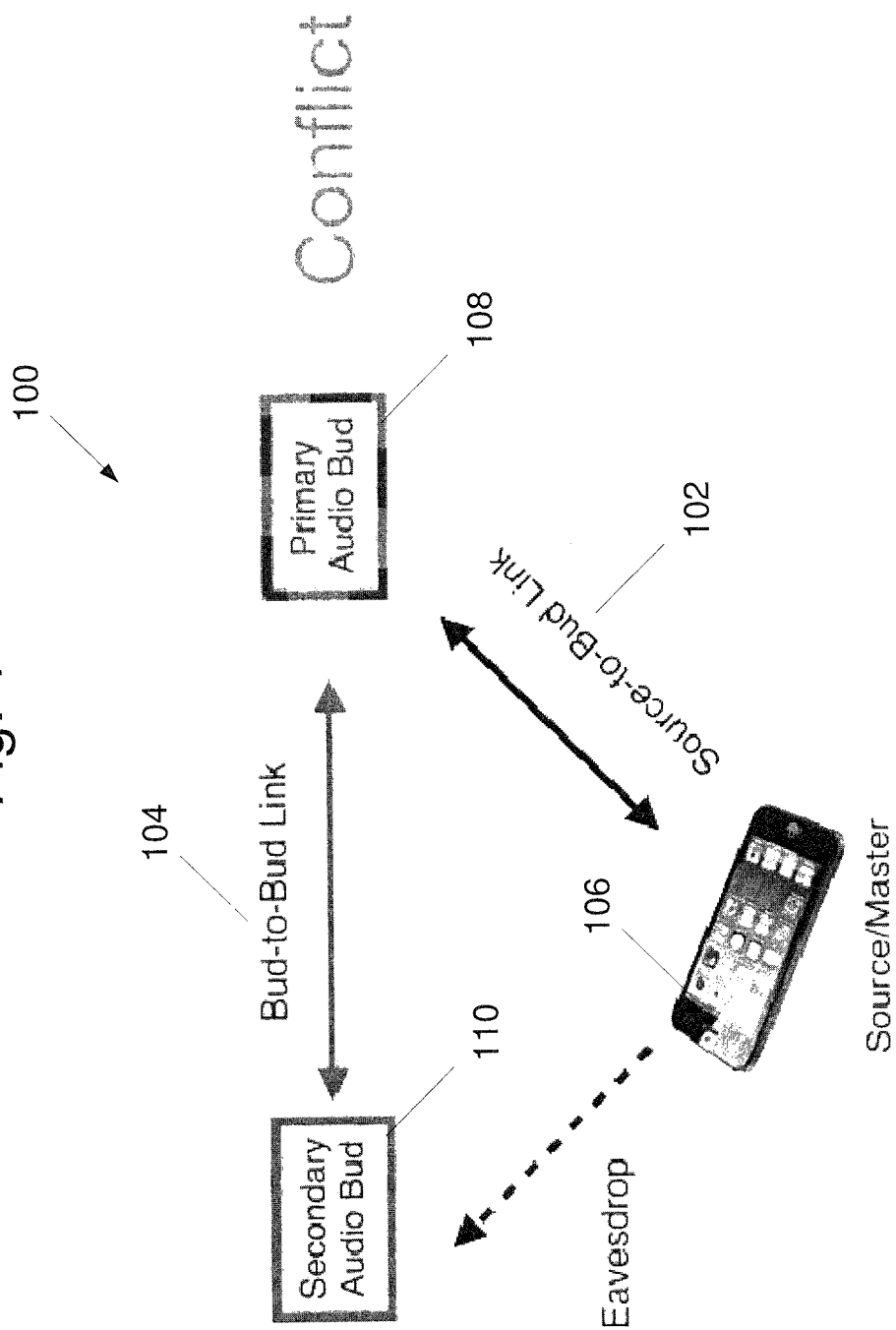
FIG. 1 shows an exemplary embodiment of a scatternet including two piconets and for use in wireless audio headphones.

The exemplary embodiments may be further understood with reference to the following description and the appended drawings, wherein like elements are referred to with the same reference numerals. The exemplary embodiments describe mitigating scheduling conflicts in wireless communication devices within a scatternet. It should be noted that while the exemplary embodiments described herein refer to scheduling conflicts in a Bluetooth scatternet, any type of network may implement the systems and methods described herein, and thus the various embodiments are not limited to a Bluetooth scatternet or piconets in general. Furthermore, while exemplary embodiments described herein may relate to a scatternet for use with wireless audio headphones (e.g., wireless earbuds), the systems and methods may be applied to connecting any wireless device and is not limited to wireless audio headphones.

Those skilled in the art will understand that the current methodology for establishing multiple piconets normally schedules the devices independently from one another. In other words, the scheduling between multiple piconets is not coordinated and may lead to scheduling conflicts between the connected devices. These scheduling conflicts may result in packet drops, retransmissions resulting in glitches, increased bandwidth usage, and general degradation of performance of both the network and the connected devices. In the exemplary embodiments that describe wireless audio buds, these packet drops, glitches, etc., may result in an unsatisfactory audio experience for the user.

FIG. 1 shows an exemplary embodiment of a scatternet 100 including two piconets 102 and 104 for use with two wireless audio headphones 108, 110 (e.g., wireless audio buds) in communication with a source device 106 (e.g., a mobile phone). The first piconet 102 is a source-to-bud ("S2B") piconet, wherein the source device 106 is the master and a primary audio bud 108 is a slave. The second piconet 104 is a bud-to-bud ("B2B") piconet, wherein the primary audio bud 108 is the master and a secondary audio bud 110 is a slave. In some implementations, one or more other devices also may be present in either or both of the first piconet 102 and the second piconet 104. It is noted that while the source device 106 may not be aware of the presence of the secondary audio bud 110, the secondary audio bud 110 may "eavesdrop" on the source device 106 as it communicates with the primary audio bud 108. Specifically, the secondary audio bud 110 may know the schedule for communications between the secondary audio bud 110 and the primary audio bud 108 on the B2B piconet 104. When there are no scheduled communications on the B2B piconet 104, the secondary audio bud 110 may eavesdrop on the communication between the source device 106 and the primary audio bud 108. Since it is generally assumed that the secondary audio bud 110 and the primary audio bud 108 will be in close physical proximity to each other, the secondary audio bud 110 may have generally the same (or in some cases, an even better) communication channel to listen to communications from the source device 106.

Figures 2, 3:
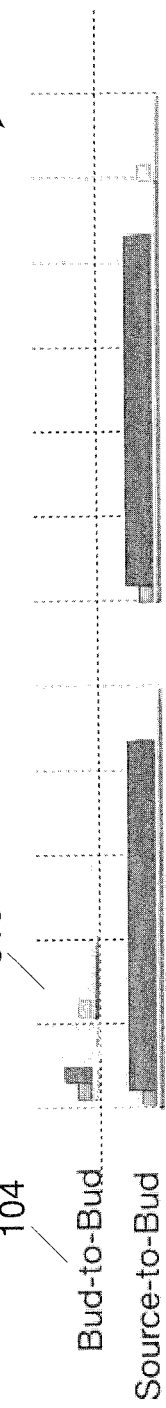
FIG. 2 shows an exemplary table for the packet types and payload of a bud-to-bud ("B2B") piconet for wireless audio headphones.
FIG. 3 shows show an exemplary graph of a scheduling conflict between a B2B piconet and a source-to-bud ("S2B") piconet for wireless audio headphones in communication with a source device.

The B2B piconet 104 may be used for audio synchronization and general control (e.g., battery life, adaptive frequency hopping ("AFH") map updates, etc.) between the two audio buds 108 and 110. FIG. 2 shows an exemplary table 200 for the packet types and payload(s) of the B2B piconet 104.

As illustrated in table 200, the packet types may include NULL packets, POLL packets, ID packets, and payload packets (e.g., 2-DH1 Bluetooth packets). The NULL and POLL packets may be characterized as short general control packets that utilize the greatest portion of the B2B link. Thus, as can be seen from the table 200, a great number of the packets exchanged over the B2B piconet 104 may have a small payload. As will be described in greater detail below, this characteristic of the B2B packets may be used to improve scheduling coordination between the B2B piconet 104 and the S2B piconet 102.

FIG. 3 shows an exemplary graph 300 of a scheduling conflict between the B2B piconet 104 and the S2B piconet 102 for the wireless audio buds 108, 110 in communication with the source device 106. Specifically, the graph 300 illustrates packet transmissions over time, wherein the highlighted portion 310 depicts the time in which conflicts may occur. That is, at the times within the highlighted portion 310, both the B2B piconet 104 and the S2B piconet 102 may have communications scheduled that may lead to a conflict between the B2B piconet 104 and the S2B piconet 102. As noted above, scheduling conflicts between the S2B piconet 102 and the B2B piconet 104 may cause Bluetooth audio packet drops and retransmissions, thereby resulting in audio glitches. When compared with a wired link between buds or headphones, the wireless B2B link may utilize a greater main link bandwidth and thereby can result in degraded overall performance.

According to the exemplary embodiments of the systems and methods described herein, multiple B2B link transmission schemes are proposed to avoid conflicting with S2B transmissions. These exemplary transmission schemes may include, but are not limited to, partial-slot schemes and full-slot-listen schemes, that utilize either S2B partial slots or S2B full slots, respectively, that do not occupy main link bandwidth (e.g., source link bandwidth). These exemplary schemes will be described in greater detail below, but may be described in general as using available time within the schedule of the S2B piconet 102 to schedule communications for the B2B piconet 104. The time in the schedule of the S2B piconet 102 may be separated into multiple time slots and thus, the exemplary schemes are termed "slot" schemes because the schemes use one or more of these slots in the S2B piconet 102 schedule. Using available time in the S2B piconet 102 schedule (e.g., time when there are no communications scheduled for the S2B piconet 102) for B2B piconet 104 communications prevents scheduling conflicts between the two piconets 102 and 104.

Figure 4:
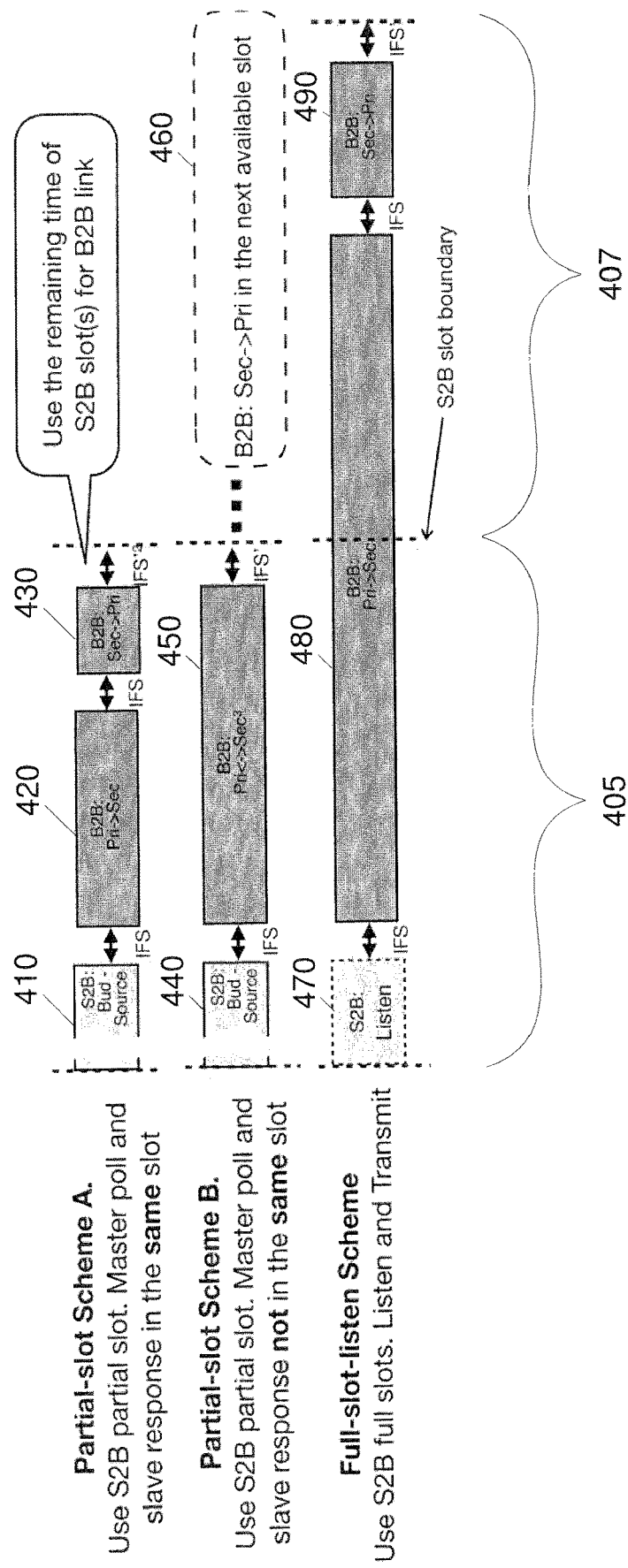
FIG. 4 shows a transmission graph using the various sub-schemes for partial slot and full-slot-listen according to the exemplary embodiments described herein.

FIG. 4 shows a transmission graph 400 using the various sub-schemes for partial slot and full-slot-listen, according to the exemplary embodiments described herein. It may be considered in graph 400 that two (2) S2B slots 405 and 407 are illustrated. Two of the exemplary partial-slot schemes may be referred to as Partial-slot Scheme A and Partial-slot Scheme B. According to the exemplary partial-slot operations, the B2B piconet 104 may use remaining time in the S2B slot(s) 405, 407 when transmission and reception with the source device 106 via the S2B piconet 102 is finished. The two Partial-slot Schemes A and B may be differentiated based on whether the B2B poll and response are included within the same partial slot(s). One skilled in the art would understand that the poll refers to the master to slave transmission (e.g., primary audio bud 108 to secondary audio bud 110 transmission) while the response refers to the slave to master transmission (e.g., secondary audio bud 110 to primary audio bud 108 transmission). As indicated in FIG. 4, the Partial-slot Scheme A may use an S2B piconet partial slot 405, incorporating the master poll 420 and slave response 430 in the same slot with inter-frame spacing ("IFS"). IFS may be defined as the time gap between frames for transmission/reception ("Tx/Rx") switching, baseband processing, etc. For example, the IFS may be a hardware constraint to allow the various hardware components of the primary audio bud 108 and the secondary audio bud 110 to tune from the S2B piconet 102 to the B2B piconet 104, switch between a transmission mode and a reception mode, etc. No communication should occur during this IFS to allow the hardware components to be set up properly to commence communications. Minimizing the IFS design (e.g., the time for IFS) may allow for communications to meet the maximum supported B2B payload requirements.

According to the transmission graph 400 of FIG. 4, the Partial-slot Scheme A allows for the available time in slot 405 after the S2B piconet communication 410 to include both the B2B communication 420 from primary audio bud 108 to the secondary audio bud 110, as well as the B2B communication 430 from secondary audio bud 110 to the primary audio bud 108. Accordingly, both of these the B2B communications 420 and 430 may be included in the same slot 405, using the available time of the S2B slot 405 for the B2B link.

The Partial-slot Scheme B may also use an S2B piconet partial slot, however the master poll and slave response are not included in the same slot. For instance, the available time in slot 405 following the S2B piconet communication 440 may include the B2B communication 450 from primary audio bud 108 to the secondary audio bud 110. However, the B2B communication 460 from secondary audio bud 110 to the primary audio bud 108 may take place in the next available slot. As will be described in greater detail below, the next available slot may or may not be the next slot 407. That is, the B2B communication 460 may occur in slot 407, but need not always occur in slot 407. Instead, in some instances, the B2B communication 460 may occur during a later slot. Accordingly, while these B2B communications 450 and 460 may use the available time of the S2B slot for communications on the B2B link, these B2B communications 450 and 460 do not reside in the same slot.

In contrast to either of the Partial-slot Schemes, the exemplary Full-slot Scheme may use S2B full slots to listen and transmit communications. For instance, a B2B communication 480 may initiate listen up until a header portion of the S2B communication 470 to determine if the B2B communication 480 may use the remaining portion of the S2B slot 405. The B2B communication 480 may also determine whether it may use the next S2B slot 407, as well, if the source device 106 does not use it (e.g., for polling the audio buds 108 and 110). Accordingly, the B2B communication 480 may opportunistically utilize both the remaining portion of the S2B slot 405 and a further portion of the following S2B slot 407 for the communication from the primary audio bud 108 to the secondary audio bud 110. The following S2B slot 407 may also include the B2B communication 490 from secondary audio bud 110 back to the primary audio bud 108.

It should be noted that the above has described various exemplary slot schemes and the description below referring to FIGS. 5-7 will describe these slot schemes in more detail. However, it has not yet been described when to select one or more of the exemplary schemes for use. The exemplary reasons or criteria to select any one of these schemes will be described in greater detail below.

Figure 5:
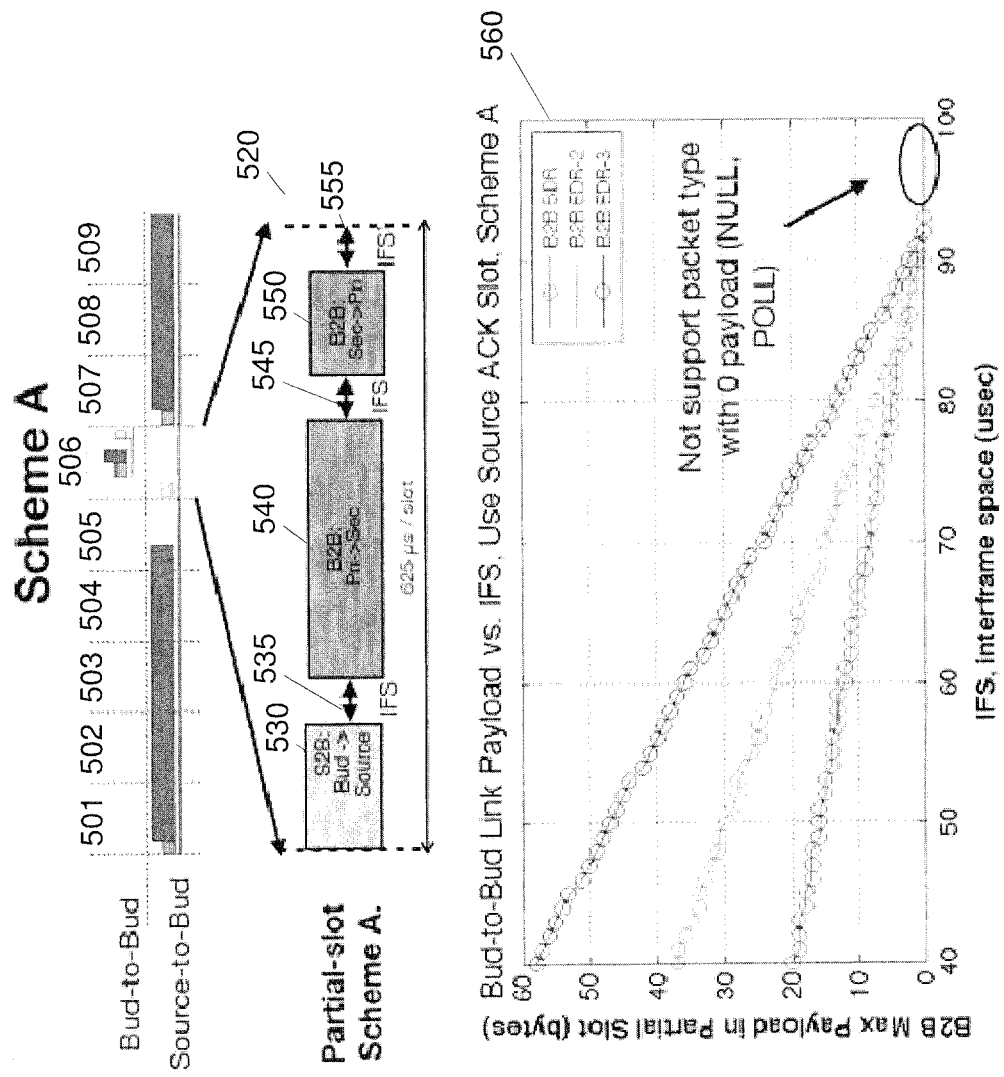
FIG. 5 shows the transmission graph for an example of a Partial-slot Scheme, as well as the impact on the IFS, according to the exemplary embodiments described herein.

FIG. 5 shows the transmission graph 500 for the Partial-slot Scheme A as well as an impact graph 560 on the IFS according to the exemplary embodiments described herein. In this example, it may be considered that the transmission graph 500 shows nine (9) slots 501-509 in the S2B piconet 102 schedule. For the purposes of this example, it may be considered that the slots 501-505 and 507-509 are being used for S2B piconet 102 communications and there is no available time in these slots for any B2B piconet 104 communications. However, the slot 506 may be considered to have available time that may be used for B2B piconet 104 communications. For example, the slot 506 may be the slot in the S2B piconet 102 schedule that is used for an acknowledgement ("ACK") that is sent from the slave (primary audio bud 108) to the master (source 106). This ACK may take up little time of the slot 506 such that the remaining time of the slot 506 may be used for the B2B piconet 104 communications, specifically using the Partial-slot Scheme A.

This is shown in more detail in the exploded view 520 of the slot 506. In this example, the slot 520 may be a 625 μs time slot. However, it is noted that the slot 506 having a length of 625 μs is only exemplary and other slot lengths may be used and may depend on the type of communication scheme being used for the piconet. The first portion of the slot 506 is used for the S2B communication 530 (e.g., the ACK transmitted from the primary audio bud 108 to the source 106). However, the remainder of the slot 506 is available for B2B piconet 104 communications. It is noted that since the primary audio bud 108 is a member of the S2B piconet 102 and the secondary audio bud 110 eavesdrops on the S2B piconet 102, each of these devices may understand the schedule for the S2B piconet 102 and may understand that there is available time in the slot 506 for the B2B piconet 104 communications.

Thus, after the S2B communication 530, the primary audio bud 108 and the secondary audio bud 110 may tune to the B2B piconet 104 (and take any other steps to prepare for communication via the B2B piconet 104) during the IFS 535. After IFS 535, the primary audio bud 108 may transmit a B2B communication 540 to the secondary audio bud 110. At the completion of the B2B communication 540, there is another IFS 545 where the primary audio bud 108 and the secondary audio bud 110 switch between the respective transmission and reception modes. After IFS 545, the secondary audio bud 110 may transmit a B2B communication 550 to the primary audio bud 108. At the completion of the B2B communication 550, there is another IFS 555 where the primary audio bud 108 and the secondary audio bud 110 may tune to the S2B piconet 102 to prepare to receive the transmissions scheduled for the slot 507.

As can be seen from this example, the Partial-slot Scheme A allows a complete round (poll/response) of B2B piconet communications (e.g., B2B communications 540 and 550) within the slot 506. Referring back to the graph 500, it can be seen that this scheme prevents any scheduling conflicts between the S2B piconet 102 and the B2B piconet 104 because the B2B piconet 104 communications (e.g., B2B communications 540 and 550) are limited to times when there are no scheduled S2B piconet 102 communications. This is generally made possible based on the fact that, as shown above in table 200, the B2B communications have a size that allows the communications to be inserted into the available time within the S2B piconet 102 slots without degradation in the performance of the B2B piconet 104. However, it is noted that there is no specific size requirement for the piconet communications to use the exemplary schemes described herein. Rather, the exemplary schemes may be used to avoid scheduling conflicts in the scatternet when the use of the schemes does not seriously degrade communications within any of the individual piconets.

The impact graph 560 illustrates the maximum supported B2B packet payload length for various transmission rates (e.g., basic date rate ("BDR"), enhanced data rate ("EDR")-2, EDR-3, etc.) versus IFS for the Partial-slot Scheme A. As can be seen from the graph 560, a shorter IFS may allow for higher B2B data transfers.

Figure 6:
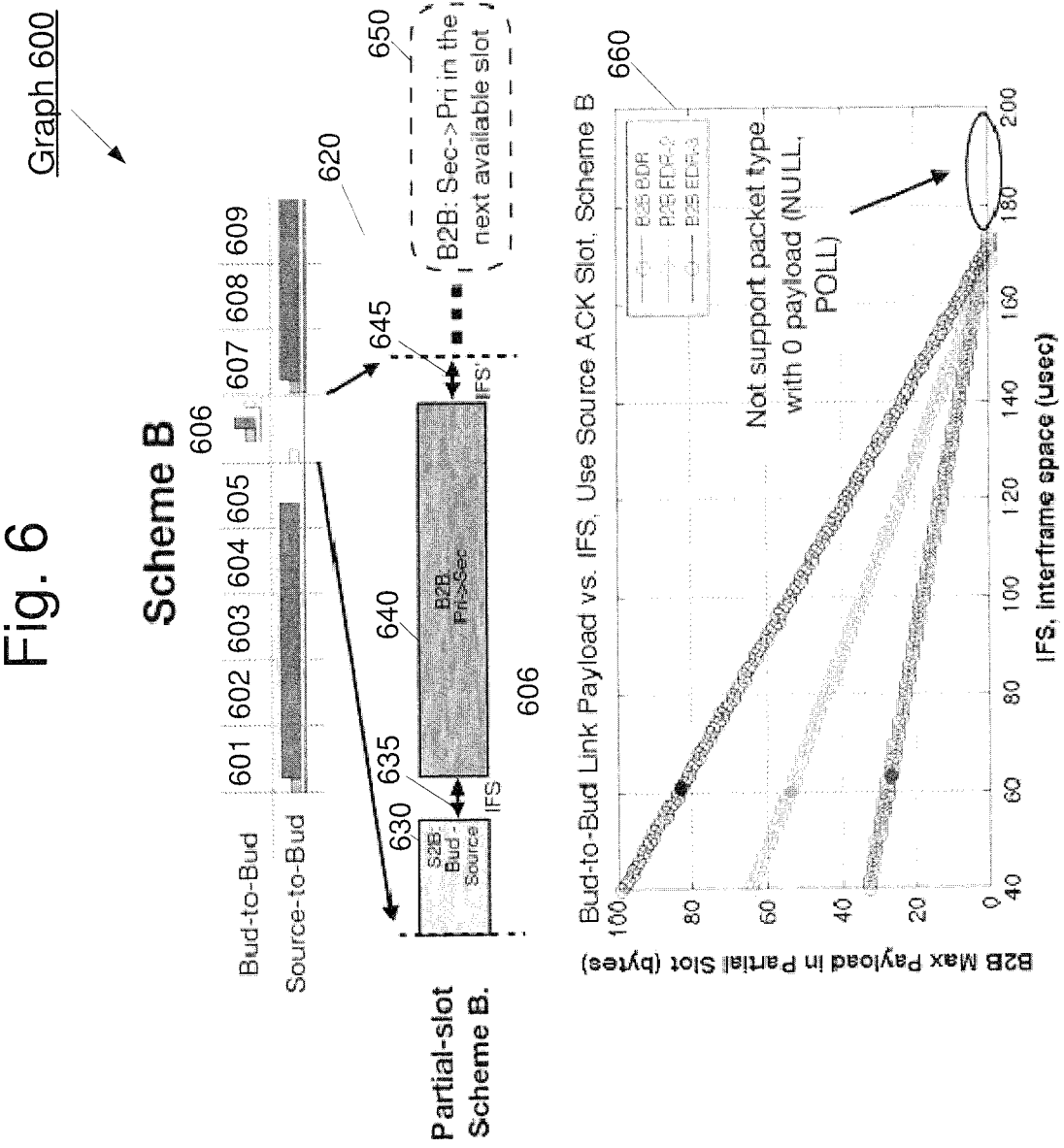
FIG. 6 shows the transmission graph for a further example of a Partial-slot Scheme, as well as the impact on the IFS, according to the exemplary embodiments described herein.

FIG. 6 shows the transmission graph 600 for a further example of a Partial-slot Scheme, as well as an impact graph 660 on the IFS, according to the exemplary embodiments described herein. Similar to the graph 500 of FIG. 5, the transmission graph 600 shows nine (9) slots 601-609 in the S2B piconet 102 schedule with the slots 601-605 and 607-609 being used for S2B piconet 102 communications. However, the slot 606 may be considered to have available time that may be used for B2B piconet 104 communications.

Again, the slot 606 may be the slot in the S2B piconet 102 schedule that is used for the ACK that is sent from the slave (primary audio bud 108) to the master (source 106). This available time may be used for the B2B piconet 104 communications, specifically using the Partial-slot Scheme B. It should be noted that the slot 606 may also be used for other short S2B piconet 102 communications besides the ACK communication described above or the slot 606 may have no scheduled S2B piconet 102 communications, thereby leaving at least a portion of the slot 606 available for B2B piconet 104 communications.

This is shown in more detail in the exploded view 620 of the slot 606. The first portion of the slot 606 is used for the S2B communication 630 (e.g., the ACK transmitted from the primary audio bud 108 to the source 106). However, the remainder of the slot 606 is available for B2B piconet 104 communications. Similar to the description above, the primary audio bud 108 and the secondary audio bud 110 may understand the schedule for the S2B piconet 102 and may understand that there is available time in the slot 606 for the B2B piconet 104 communications.

Thus, after the S2B communication 630 and the IFS 635, the primary audio bud 108 may transmit a B2B communication 640 to the secondary audio bud 110. At the completion of the B2B communication 640, there is another IFS 645 where the primary audio bud 108 and the secondary audio bud 110 may tune to the S2B piconet 102 to prepare to receive the transmissions scheduled for the slot 607.

As can be seen from this example, the Partial-slot Scheme B allows a single B2B piconet communication (e.g., B2B communication 640) within the slot 606. In this example, the single B2B communication 640 may be considered a poll that is transmitted from the master (primary audio bud 108) to the slave (secondary audio bud 110). However, the single B2B communication may also be a response, e.g., a communication from the slave to the master. Thus, in this example, the primary audio bud 108 has transmitted a poll and will be expecting a response to that poll from the secondary audio bud 110. This response is illustrated in FIG. 6 as the B2B communication 650 that is not shown as occurring within the slot 606. Specifically, in Partial-slot Scheme B, the B2B communication 650 will occur in a later slot when the later slot has available time for the B2B communication 650. In this example, this later slot is some slot after slot 609 that is not illustrated in FIG. 6. However, it is possible that the next slot that has available time may be any slot that occurs after the slot 606. In this manner, the complete communication (poll/response) between the primary audio bud 108 and the secondary audio bud 110 may be accomplished. It is noted that the reason for splitting the poll/response in the manner proposed by Partial-slot Scheme B is that the two B2B communications (including the required IFSs) may not fit in the remaining available time after the S2B communication 630 in the slot 606.

Referring back to the graph 600, it can be seen that this scheme also prevents any scheduling conflicts between the S2B piconet 102 and the B2B piconet 104 because the B2B piconet 104 communication (e.g., B2B communication 640) is limited to times when there are no scheduled S2B piconet 102 communications.

Similar to FIG. 5, the impact graph 660 illustrates the maximum supported B2B packet payload length for various transmission rates (e.g., BDR, EDR-2, EDR-3, etc.) versus IFS for the Partial-slot Scheme B. Once again, a shorter IFS may allow for higher B2B data transfers.

FIG. 7 shows the transmission graph 700 for an example of a Full-slot-listen Scheme, as well as an impact graph 760 on the IFS, according to the exemplary embodiments described herein. Prior to describing the transmission graph 700, FIG. 7 also shows two exemplary Bluetooth Asynchronous Connection-Less ("ET ACL") frame formats for the S2B communications, a BDR frame format 750 and an EDR frame format 755. It can be seen that each of these frame formats 750 and 755 include an access code and header portion. One skilled in the art would understand that the access code identifies packets exchanged on a physical channel. Thus, packets sent in the same physical channel may be preceded by the same access code. Furthermore, the packet header contains information indicating a destination slave for an exemplary packet in a master-to-slave transmission slot. The header may also indicate the source slave for a slave-to-master transmission slot.

The components of the B2B piconet 104 (e.g., the primary audio bud 108 and the secondary audio bud 110) may listen to the communications of the S2B piconet 102, including the access code and header portions, to determine whether the full slot will be available for B2B transmissions. That is, the contents of these two fields of the frame formats 750 and 755 will indicate to the primary audio bud 108 and the secondary audio bud 110 whether the S2B piconet 102 will be using the remainder of the slot. As shown in FIG. 7, the access code and header portions of the frame formats may have a length of 126 µs. Thus, if the remainder of the slot is available, the remaining time will be the length of the slot minus 126 µs. According to one embodiment, the availability may be determined based on information included in the access code and header. Alternatively, the availability may be determined based on the lack of an access code and/or header transmitted in the first portion of the slot.

For instance, if there is no energy detected by the slot start nominal time plus jitter requirement time (e.g., 10 µs), then the remaining slot time (e.g., 615 µs=625 µs−10 µs) and the next full slot (e.g., 625 µs) may be available. Alternatively, if there is energy detected, then the access code and header portion may be considered. Specifically, slot time may be available if the detected access code is not matched (e.g., the packet is not sent to the source piconet), or if the access code is matched but not the packet header (e.g., the packet is sent to the source piconet but not to the intended receiver). The remaining slot time may be based on the full slot (625 µs) less the current decision time taken from the slot start. Accordingly, this remaining slot time and the next full slot (625 µs) may be available. However, if the packet is addressed to the intended receiver, then the remaining slot time less the decision time and the next full slot may not be available for use.

The transmission graph 700 shows two slots 710 and 715. In this example, each slot is 625 µs for a total length of 1250 µs for the two slots 710 and 715. It is noted that in this example, two slots 710 and 715 are shown because the slots are arranged in an even/odd arrangement meaning that if there is no payload scheduled for transmission in the S2B piconet 102 in the even slot (e.g., slot 710) there will also be no transmission scheduled for the next odd slot (e.g., slot 715). For example, if no poll is sent, a corresponding response also will not be sent. Thus, once the primary audio bud 108 and the secondary audio bud 110 determine that the remainder of slot 710 is available, this will also mean that the entire slot 715 will also be available. Thus, in this example, the primary audio bud 108 and the secondary audio bud 110 will listen 720 for the first 126 µs of the slot 710. If it is determined that there is no S2B communication scheduled for the remainder of the slot 710, the primary audio bud 108 and the secondary audio bud 110 will understand that the remainder of slot 710 (e.g., 625 μs-126 μs) and the entire slot 715 (e.g., 625 μs) will be available for the B2B communications. This description will continue as if this is the case, e.g. the remainder of slot 710 and all of slot 715 are available for the B2B communications.

After the listen period 720, there will be an IFS 725 when the primary audio bud 108 and the secondary audio bud 110 may tune to the B2B piconet 104 (and take any other steps to prepare for communication via the B2B piconet 104). After IFS 725, the primary audio bud 108 may transmit a B2B communication 730 to the secondary audio bud 110. The B2B communication 730 may be the poll, e.g., the transmission from the master (primary audio bud 108) to the slave (secondary audio bud 110). In this example, the B2B communication 730 is shown as using the remainder of the slot 710 and extending into slot 715. This may be the case, but it also may be the case that the B2B communication 730 is completed prior to the end of the slot 710. The point being that the complete poll may be transmitted even if it is longer than the remainder of the slot 710.

At the completion of the B2B communication 730, there is another IFS 735 where the primary audio bud 108 and the secondary audio bud 110 switch between the respective transmission and reception modes. After IFS 735, the secondary audio bud 110 may transmit the response B2B communication 740 to the primary audio bud 108. At the completion of the B2B communication 740, there is another IFS 745 where the primary audio bud 108 and the secondary audio bud 110 may tune to the S2B piconet 102 to prepare for the transmissions scheduled for the next slot.

As can be seen from this example, the Full-slot-listen Scheme allows a complete round (poll/response) of B2B piconet communications (e.g., B2B communications 730 and 740) within the slots 710 and 715 that are not being used by the S2B communications. Thus, in a similar manner to the Partial-slot schemes, this scheme also prevents any scheduling conflicts between the S2B piconet 102 and the B2B piconet 104 because the B2B piconet 104 communications (e.g., B2B communications 730 and 740) are limited to times when there are no scheduled S2B piconet 102 communications. However, this Full-slot-listen Scheme also allows for a B2B communication to extend beyond the current slot. In contrast, in each of the Partial-slot schemes, the B2B communications that are started in a slot are completed prior to the end of that slot.

The impact graph 760 illustrates the maximum supported B2B packet payload length for various transmission rates (e.g., BDR, EDR-2, EDR-3, etc.) versus IFS for the Full-slot-listen Scheme. Unlike the impact graphs for the Partial-slot schemes, the impact graph 760 does not converge to zero (0) because, as described above, the B2B communications are allowed to extend beyond the current slot.

Figure 8:
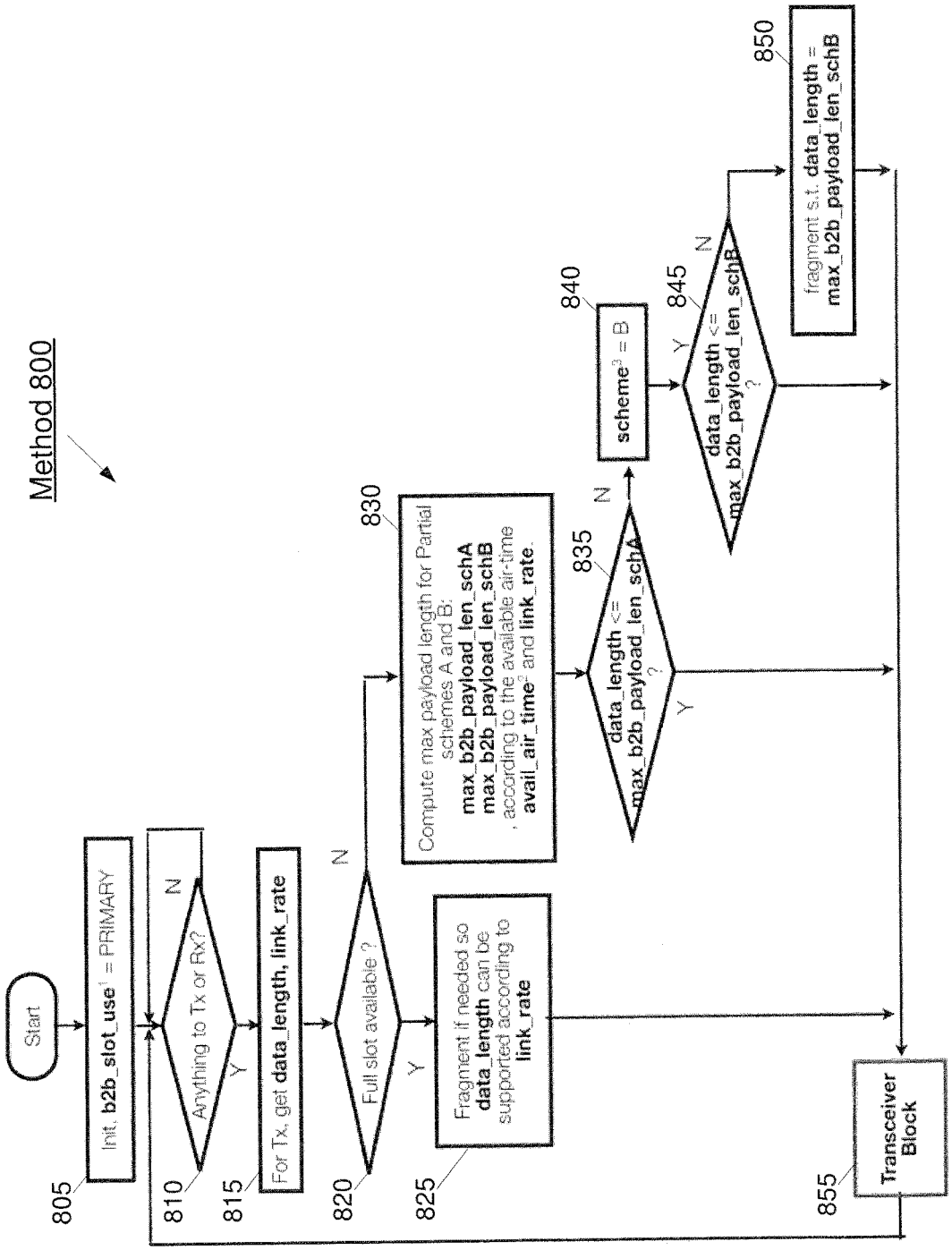
FIG. 8 shows an exemplary method for mitigating scheduling conflicts in wireless communication devices according to various embodiments described herein.

FIG. 8 shows an exemplary method 800 for mitigating scheduling conflicts in wireless communication devices according to various embodiments described herein. The method 800 will be described with reference to the scatternet 100 including the S2B piconet 102 having the source 106 (master) and the primary audio bud 108 (slave) and the B2B piconet 104 having the primary audio bud 108 (master) and the secondary audio bud 110 (slave). Each of the primary audio bud 108 and the secondary audio bud 110 may perform the operations of method 800.

In 805, the initial B2B transmission slot use is set to "Primary." In other words, the primary audio bud 108 may be designated to use the B2B slot. In 810, it may be determined whether there is any data to transfer or receive. This refers to data that is to be exchanged over the B2B piconet 104. If there is no data to transmit or receive, the method 800 may loop until there is data to transmit or receive. If there is data to transmit or receive, the method 800 may advance to 815.

In 815, information regarding the data length and the link rate for transmission may be received. This information may be used later in the method as will be described in greater detail below. In 820, it may be determined whether a full slot is available in the S2B communication. The manners of determining whether a full slot is available were described above with reference to FIG. 7. Thus, in this example, the Full-slot-listen Scheme takes priority, e.g., if it is possible to use the full slot scheme, this scheme will be used. If a full slot is available, the method 800 may advance to 825 to determine if fragmentation is required. Specifically, in 825 the transmission may be fragmented so that the data length can be supported according to the link rate. For example, referring to FIG. 7, even though the B2B communication may take up the remainder of slot 710 and the complete slot 715, the amount of data that is to be transmitted, based upon the link rate of the B2B piconet 104, may take more time than is provided in slots 710 and 715. In this case, the data will be fragmented such that only the amount of data that can be transmitted in the time of slots 710 and 715 will be used. The remaining data will be transmitted at some later available time. After fragmentation in 825 (if used), the method 800 may advance to the transceiver block 855. The operations associated with the transceiver block 855 will be described in greater detail below with respect to FIG. 9.

However, if a full slot is not available in 820, the method 800 may advance to 830. In 830, the maximum payload may be calculated for each of the partial-slot schemes (e.g., Scheme A or Scheme B). Specifically, the maximum payload for B2B transmissions may be based on the available air-time (e.g., the remaining time in the current slot less any required IFS time) and the link rate information retrieved in 815. For Scheme A, the maximum payload will consider both the poll and response since both communications will be sent in the available time in the current slot if Scheme A is ultimately used. For Scheme B, only the poll will be considered in the maximum payload determination because it will be considered that only the poll will be sent in the available time in the current slot.

Upon calculating the maximum payload length for both Partial-slot Scheme A and Partial-slot Scheme B, in 835 the data length retrieved in 815 may be compared to the maximum payload length for Partial-slot Scheme A. If the data length is less than or equal to the maximum payload length determined for Partial-slot Scheme A, the method 800 may advance to the transceiver block 855. However, if the data length is greater than the maximum payload length determined for Partial-slot Scheme A, the method 800 may advance to 840.

In 840, the scheme may be designated as the Partial-slot Scheme B. That is, since the data length is greater than the maximum length allowed for Scheme A, Scheme B will be used. In 845, the data length retrieved in 815 may be compared to the maximum payload length for Partial-slot Scheme B. If the data length is less than or equal to the maximum payload length determined for Partial-slot Scheme B, the method 800 may advance to the transceiver block 855. However, if the data length is greater than the maximum payload length for Partial-slot Scheme B, the method 800 may advance to 850. In 850, the space time ("s.t.") of the transmission data may be fragmented such that the data length is equal to the maximum payload length for Partial-slot Scheme B. The fragmenting may be similar to that described above with reference to 825. For example, even though Partial-slot Scheme B is selected, the data length for the poll transmission may exceed the maximum payload length. Thus, the payload will be fragmented such that the payload may be transmitted in the current time slot. Upon fragmenting the transmission in 850, the method 800 may advance to the transceiver block 855.

Figure 9:
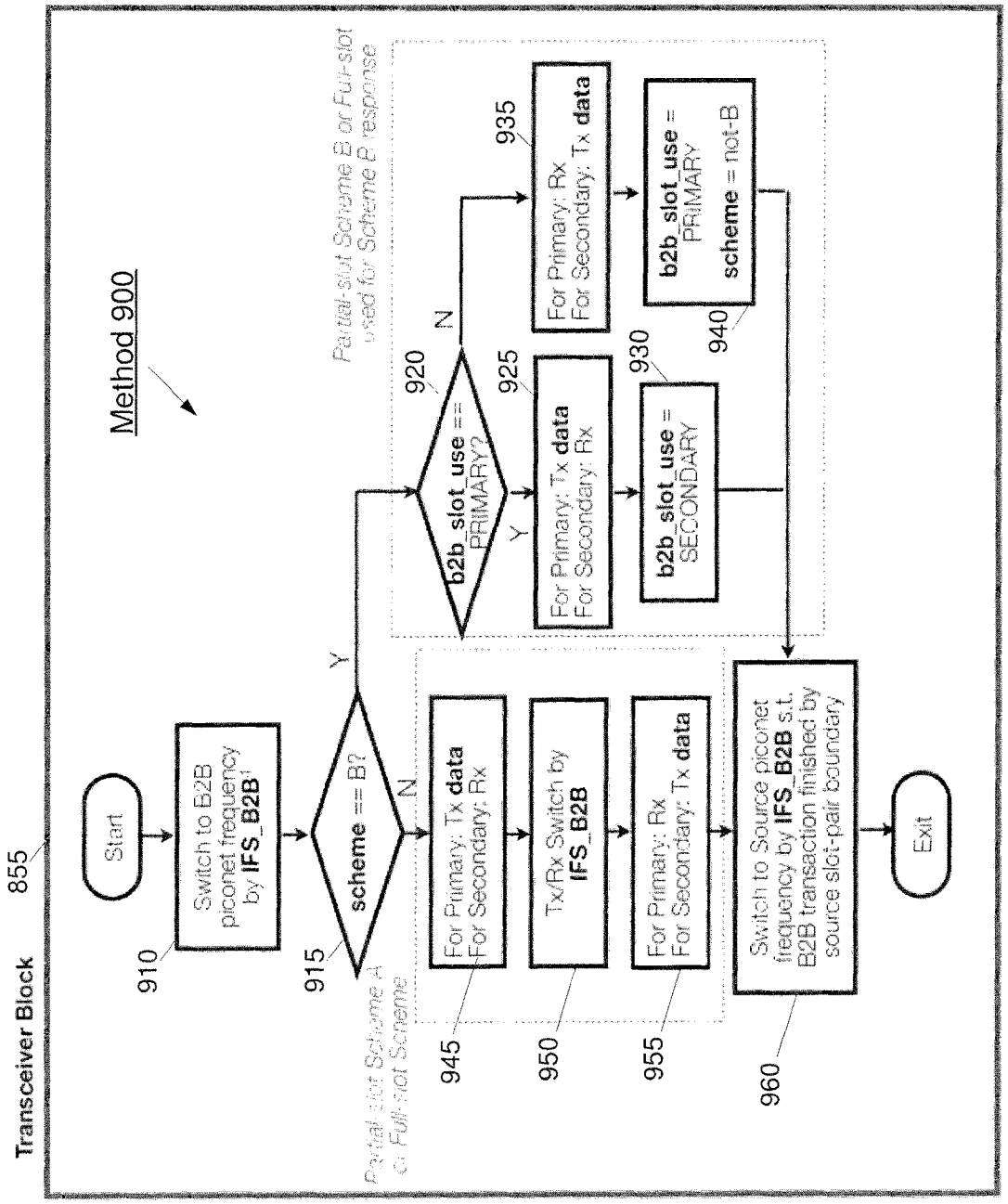
FIG. 9 shows an exemplary method for mitigating scheduling conflicts in wireless communication devices based on different schemes described herein.

FIG. 9 shows an exemplary method 900 for mitigating scheduling conflicts in wireless communication devices based on different schemes described herein. Specifically, method 900 may represent the operations of the transceiver block 855 of method 800 in FIG. 8. More specifically, the method 900 may represent the operations of the hardware transceiver devices in the primary audio bud 108 and the secondary audio bud 110.

In 910, the transceivers of the devices of the B2B piconet 104 (e.g., the primary audio bud 108 and the secondary audio bud 110) may switch to a B2B piconet frequency. This operation may correspond to the IFS 535, 635 and 725 of FIGS. 5-7, respectively. In 915, it may be determined whether the scheme has been designated as the Partial-slot Scheme B. If the B2B communications is not using Scheme B, the method 900 may advance to 945 for Partial-slot Scheme A and Full-slot-listen Scheme operations. In 945, it is presumed that the scheme is either Partial-slot Scheme A or Full-slot-listen Scheme (e.g., not B). In 945, the primary audio bud 108 may transmit data while the secondary audio bud 110 may receive data. For example, if Partial-slot Scheme A is currently being used, the primary audio bud 108 will transmit the B2B communication 540 of FIG. 5 and the secondary audio bud 110 will receive the B2B communication 540 during 945. If the Full-slot-listen Scheme is currently being used, the primary audio bud 108 will transmit the B2B communication 730 of FIG. 7 and the secondary audio bud 110 will receive the B2B communication 730 during 945.

In 950, the transceivers of the primary audio bud 108 and the secondary audio bud 110 may switch their corresponding operating mode (e.g., the primary audio bud 108 transceiver from transmission mode to reception mode and the secondary audio bud 110 transceiver from reception mode to transmission mode). This operation may correspond to the IFS 545 and 735 of FIGS. 5 and 7, respectively. Following the switch, in 955 the primary audio bud 108 may receive data while the secondary audio bud 110 may transmit data. For example, if Partial-slot Scheme A is currently being used, the secondary audio bud 110 will transmit the B2B communication 550 of FIG. 5 and the primary audio bud 108 will receive the B2B communication 550 during 955. If the Full-slot-listen Scheme is currently being used, the secondary audio bud 110 will transmit the B2B communication 740 of FIG. 7 and the primary audio bud 108 will receive the B2B communication 740 during 945. When this is complete, the method 900 will advance to 960 that will be described in greater detail below.

Returning to 915, if the B2B communication is using Scheme B, the method 900 may advance to 920. In 920, it may be determined whether the B2B slot use is by the primary audio bud 108. As described with reference to 805 of method 800, the B2B slot use is initialized to the primary audio bud 108. If the B2B slot is currently set to the primary audio bud 108, in 925 the primary audio bud 108 may transmit data while the secondary audio bud 110 may receive data. For example, the primary audio bud 108 will transmit the B2B communication 640 of FIG. 6 and the secondary audio bud 110 will receive the B2B communication 640 during 925. Following 925, the B2B slot use may be set to the secondary audio bud 110 in 930 and the method 900 may advance to 960 that will be described in greater detail below.

If it is determined in 920 that the B2B slot use is not by the primary audio bud 108, in 935 the primary audio bud 108 may receive data while the secondary audio bud 110 may transmit data. For example, the secondary audio bud 110 will transmit the B2B communication 650 of FIG. 6 and the primary audio bud 108 will receive the B2B communication 650 during 935. Following 935, the B2B slot use may be set to the primary audio bud 108 in 940 and the scheme may be designated as "not B." Furthermore, the method 900 may advance to 960.

Thus, after one of operations 930, 940 or 955, the method 900 advances to 960 where the transceivers of the devices of the B2B piconet 104 (e.g., the primary audio bud 108 and the secondary audio bud 110) may switch to a S2B piconet frequency. This operation may correspond to the IFS 555, 645 and 745 of FIGS. 5-7, respectively.

It should be noted that after step 960 is completed, referring back to FIG. 8, the method 800 will return to 810 to determine if there is any data to be transmitted or received. More specifically, upon completing the method 900 as described in the transceiver block 855 of FIG. 9, the operations of the method 800 may restart at step 810 with a possible change in conditions (e.g., B2B slot use flag, scheme flag, etc.). For instance, as noted above, the B2B slot use may be set to "Primary" at 805 upon an initial operation of method 800. However, this condition may change from "Primary" to "Secondary" when the method 800 reaches 855 and, subsequently reaches 930 in method 900. Such a change in this condition will change the operation of the transceiver 855 (specifically, at 920) upon the next iteration of method 800. Additionally, the scheme may be set to "Scheme B" at 840 upon comparing the data length to a maximum payload data length. However, this condition may change from "Scheme B" to "Scheme not-B" when the method 800 reaches 855 and, subsequently reaches 940 in method 900. Such a change in this condition will change the operation of the transceiver 855 (specifically, at 915) upon the next iteration of method 800.

Figure 10:
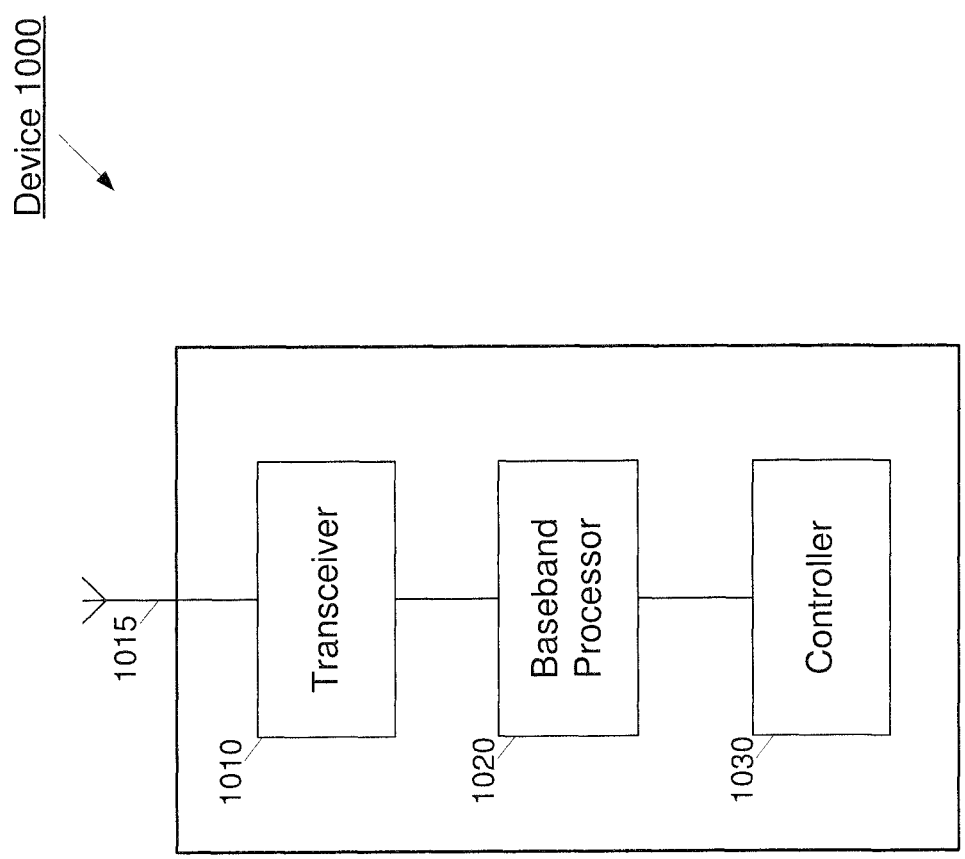
FIG. 10 shows an exemplary device 1000 (e.g., wireless audio buds) for mitigating scheduling conflicts in wireless communication devices according to various embodiments described herein

FIG. 10 shows an exemplary device 1000 (e.g., wireless audio buds) for mitigating scheduling conflicts in wireless communication devices according to various embodiments described herein. The device 1000 may represent any electronic device (e.g., primary audio bud 108) that is configured to perform wireless functionalities, such as but not limited to communicating with a master device (e.g., the source device 106) as well as a slave device (e.g., the secondary audio bud 110). However, it is noted that the device 1000 may also represent the other components of the exemplary scatternet, such as the source device 106 and the secondary audio bud 110.

Furthermore, it is noted that the device 1000 is not limited to audio buds and may represent any portable wireless device, such as, but not limited to a wearable computing device, a mobile phone, a tablet computer, a personal computer, a VoIP telephone, an Internet of Things (IoT) device, etc. The device 1000 may also be a client stationary device such as a desktop terminal.

The exemplary device 1000 may include a transceiver 1010 connected to an antenna 1015, a baseband processor 1020 and a controller 1030, as well as other components. The other components may include, for example, a memory, a battery, ports to electrically connect the device 1000 to other electronic devices, etc. The controller 1030 may control the communication functions of the transceiver 1010 and the baseband processor 1020. In addition, the controller 1030 may also control non-communication function related to the other components, such as the memory, the battery, etc.

According to one embodiment, the baseband processor 1020 may be a chip compatible with a wireless communication standard, such as Bluetooth. The baseband processor 1020 may be configured to execute a plurality of applications of the device 1000. For example, the applications may include the above-referenced methods related to the exemplary embodiments, such as but not limited to, the selection and implementation of the Partial-slot Schemes A and B and/or the Full-slot-listen Scheme as described in method 800 FIG. 8. Additionally, the transceiver 1010 may also be configured to execute a plurality of applications of the device 1000. For example, the applications may include the above-referenced methods related to the exemplary embodiments, such as but not limited to, the selection and implementation of the Partial-slot Schemes A and B and/or the Full-slot-listen Scheme as described in method 900 FIG. 9. It should also be noted that the baseband processor 1020, the controller 103 and the transceiver 1010 may include circuitry (with or without firmware) to perform the functionalities described herein. That is, the functionalities described herein are not required to be implemented as applications, but may also be implemented as chip level or board level integrated circuits.

Finally, in the above examples, various transmission schemes including slots, lengths of the slots and transmission formats have been described. It should be understood that these are all exemplary and those skilled in the art will understand that using the principles described herein for the full and partial slot schemes may be applied to different transmission schemes to accomplish scheduling coordination for different piconets.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising:
   at a wireless device configured as a slave in a first piconet and configured as a master in a second piconet:
      determining whether the wireless device has data to transmit over the second piconet to an other wireless device;
      determining an availability of a full slot in a first piconet schedule wherein the full slot is a slot in the first piconet schedule having no scheduled transmissions;
      selecting a data transmission scheme based on the availability of the full slot in the first piconet schedule; and
      transmitting the data via the second piconet to the other wireless device in accordance with the selected data transmission scheme.

2. The method of claim 1, wherein determining the availability of the full slot, comprises:
   detecting whether a first portion of a first slot of the first piconet includes a transmission;
   when there is no transmission detected in the first portion of the first slot, determining that a remainder of the first slot and a next second slot are available, wherein the next second slot comprises the full slot; and
   when there is a transmission detected in the first portion of the first slot, determining from information included in the transmission whether the remainder of the first slot and the next second slot are available, wherein the next second slot comprises the full slot.

3. The method of claim 2, wherein transmitting the data via the second piconet when it is determined that the full slot is available, comprises:
   tuning to the second piconet at the end of the first portion of the first slot; and
   starting the transmitting of the data in the first slot.

4. The method of claim 3, further comprising:
   switching from a transmission mode to a reception mode after completion of the transmitting of the data, wherein completion occurs during the first slot or the next second slot;
   receiving further data from the other wireless device via the second piconet; and
   after completion of receiving the further data, tuning to the first piconet, wherein the tuning to the first piconet is completed prior to an end of the next second slot.

5. The method of claim 1, wherein, when it is determined that the full slot is not available, the method further comprises:
   determining whether a current slot of the first piconet has available time after completion of communications of the first piconet; and
   when there is available time in the current slot of the first piconet after completion of communications of the first piconet, determining whether a duration needed for transmitting the data and receiving a response is greater than the available time.

6. The method of claim 5, wherein determining the duration comprises:
   determining a data length of the data to transmit;
   determining a link rate of the second piconet; and
   determining a maximum payload length for the selected data transmission scheme.

7. The method of claim 5, wherein, when it is determined that the time is not greater than the available time, the transmitting the data comprises:
   tuning to the second piconet at completion of communications of the first piconet in the current slot;
   transmitting the data in the current slot;
   switching from a transmission mode to a reception mode after completion of the transmitting of the data;
   receiving further data from the other wireless device via the second piconet; and
   after completion of receiving the further data, tuning to the first piconet, wherein the tuning to the first piconet is completed prior to an end of the current slot.

8. The method of claim 5, wherein, when it is determined that the time is greater than the available time, the transmitting the data comprises:
   tuning to the second piconet at completion of communications of the first piconet in the current slot;
   transmitting the data in the current slot; and
   after completion of transmitting the data, tuning to the first piconet, wherein the tuning to the first piconet is completed prior to an end of the current slot.

9. The method of claim 8, further comprising:
   determining a next slot of the first piconet in which to receive the response to transmitting the data via the second piconet, wherein the next slot is any slot subsequent to the current slot;
   when the next slot is determined, tuning to the second piconet and selecting a reception mode;

receiving further data from the other wireless device via the second piconet; and after completion of receiving the further data, tuning to the first piconet, wherein the tuning to the first piconet is completed prior to an end of the next slot.

10. A wireless device capable of communicating via a first piconet and a second piconet, comprising:
a baseband processor configured to determine whether the wireless device has data to transmit over the second piconet to an other wireless device, determine an availability of a full slot in a first piconet schedule, wherein the full slot is a slot in the first piconet schedule having no scheduled transmissions, and select a data transmission scheme based on the availability of the full slot in the first piconet schedule; and
a transceiver configured to transmit the data via the second piconet to the other wireless device in accordance with the selected data transmission scheme.

11. The wireless device of claim 10, wherein the baseband processor determines the availability of the full slot by receiving information from the transceiver as to whether a transmission was detected in a first portion of a first slot of the first piconet,
when there is no transmission detected in the first portion of the first slot, the baseband processor determines that a remainder of the first slot and a next second slot are available, wherein the next second slot comprises the full slot, and
when there is a transmission detected in the first portion of the first slot, the baseband processor determines from information included in the transmission whether the remainder of the first slot and the next second slot are available, wherein the next second slot comprises the full slot.

12. The wireless device of claim 11, wherein transmitting the data via the second piconet when it is determined that the full slot is available comprises the transceiver tuning to the second piconet at the end of the first portion of the first slot and starting the transmitting of the data in the first slot.

13. The wireless device of claim 12, wherein the transceiver is further configured to switch from a transmission mode to a reception mode after completion of the transmitting of the data, wherein the completion occurs during the first slot or the next second slot, receive further data from the other wireless device via the second piconet and after completion of receiving the further data, tune to the first piconet, wherein the tuning to the first piconet is completed prior to an end of the next second slot.

14. The wireless device of claim 10, wherein, when the baseband processor determines that the full slot is not available, the baseband processor determines whether a current slot of the first piconet has available time after completion of communications of the first piconet and when there is available time in the slot of the first piconet after completion of communications of the first piconet, determines whether a time for transmitting the data and receiving a response to transmitting the data is greater than the available time.

15. The wireless device of claim 14, wherein the baseband processor determines the time by determining a data length of the data to transmit, determining a link rate of the second piconet, and determining a maximum payload length for the selected data transmission scheme.

16. The wireless device of claim 14, wherein, when it is determined that the time is not greater than the available time, the transceiver is further configured to tune to the second piconet at completion of communications of the first piconet in the current slot, transmit the data in the current slot, switch from a transmission mode to a reception mode after completion of the transmitting of the data, receive further data from the other wireless device via the second piconet and after completion of receiving the further data, tune to the first piconet, wherein the tuning to the first piconet is completed prior to an end of the current slot.

17. The method of claim 14, wherein, when it is determined that the time is greater than the available time, the transceiver is configured to tune to the second piconet at completion of communications of the first piconet in the current slot, transmit the data in the current slot and after completion of transmitting the data, tune to the first piconet, wherein the tuning to the first piconet is completed prior to an end of the current slot.

18. A wireless device, comprising:
a non-transitory memory having a program stored thereon; and
a processor, wherein execution of the program causes the processor to perfomi operations comprising:
determining whether the wireless device has data to transmit over the second piconet to an other wireless device;
determining an availability of a full slot in a schedule of the first piconet, wherein the full slot is a slot in the first piconet schedule having no scheduled transmissions;
selecting a data transmission scheme based on the availability of the full slot in the schedule of the first piconet; and
transmitting the data via the second piconet to the other wireless device in accordance with the selected data transmission scheme.

19. The wireless device of claim 18, wherein, when it is determined that the full slot is available, utilizing a full slot transmission scheme where the data is transmitted in the available full slot.

20. The wireless device of claim 18, wherein, when it is determined that the full slot is not available, utilizing a partial slot transmission scheme where an available time in a slot of the first piconet is used to transmit the data, wherein the slot is also used to communicate data via the first piconet.

* * * * *

UNITED STATES PATENT AND TRADEMARK OFFICE
CERTIFICATE OF CORRECTION

PATENT NO. : 10,517,111 B2  
APPLICATION NO. : 15/708746  
DATED : December 24, 2019  
INVENTOR(S) : Li et al.

Page 1 of 1

It is certified that error appears in the above-identified patent and that said Letters Patent is hereby corrected as shown below:

In the Claims

Claim 1, Column 13, Line 51:
"piconet schedule wherein the full slot is a slot in the" should read "piconet schedule, wherein the full slot is a slot in the"

Claim 18, Column 16, Line 32:
"processor to perfomi operations comprising" should read "processor to perform operations comprising"

Signed and Sealed this
Fourteenth Day of April, 2020

Andrei Iancu
*Director of the United States Patent and Trademark Office*